O. & A. B. OLSTON.
COOKING APPARATUS.
APPLICATION FILED OCT. 7, 1908.

924,185.

Patented June 8, 1909.

Witnesses.

Inventors
Otto Olston
Albert B. Olston
By Litzenberg, Attorney.

UNITED STATES PATENT OFFICE.

OTTO OLSTON AND ALBERT B. OLSTON, OF PORTLAND, OREGON.

COOKING APPARATUS.

No. 924,185.          Specification of Letters Patent.          Patented June 8, 1909.

Application filed October 7, 1908. Serial No. 456,584.

*To all whom it may concern:*

Be it known that we, OTTO OLSTON and ALBERT B. OLSTON, both citizens of the United States, residing in the city of Portland, county of Multnomah, and State of Oregon, (whose respective post-office addresses are 532 Goodnough Building and 757 East Ankeny street, Portland, Oregon,) have invented certain new and useful Improvements in Cooking Apparatus, of which the following is a specification.

This invention relates to cooking apparatus and more particularly to that class of cooking apparatus commonly known and designated as "the fireless cooker," comprising a box or cabinet provided with one or more nests or chambers into which can be placed receptacles containing food stuffs previously heated to a high degree and which are then allowed to cook by their own heat.

Among the salient objects of the invention are: to provide a cooking cabinet of the character referred to in combination with a hot water tank or boiler, and especially in combination with that type of hot water tank or boiler used for domestic purposes, whereby the heat from the tank is utilized to increase the efficiency of the cooker by raising the temperature thereof; to provide a cabinet of the character referred to which will not only provide one or more cooking chambers, but at the same time inclose and increase the efficiency of the tank or boiler about which it is placed; to provide a cabinet of the character referred to which can be purchased in the market as can any other article of furniture, and which can be readily placed about the boiler, and as readily removed therefrom when it is desired to move it from one place to another; and in general, to provide a cooking cabinet of the character referred to which is practical in construction and operation and which possesses great efficiency.

The invention will be readily understood from the following description, reference being had to the accompanying drawings in which—

Figures 1, 2:
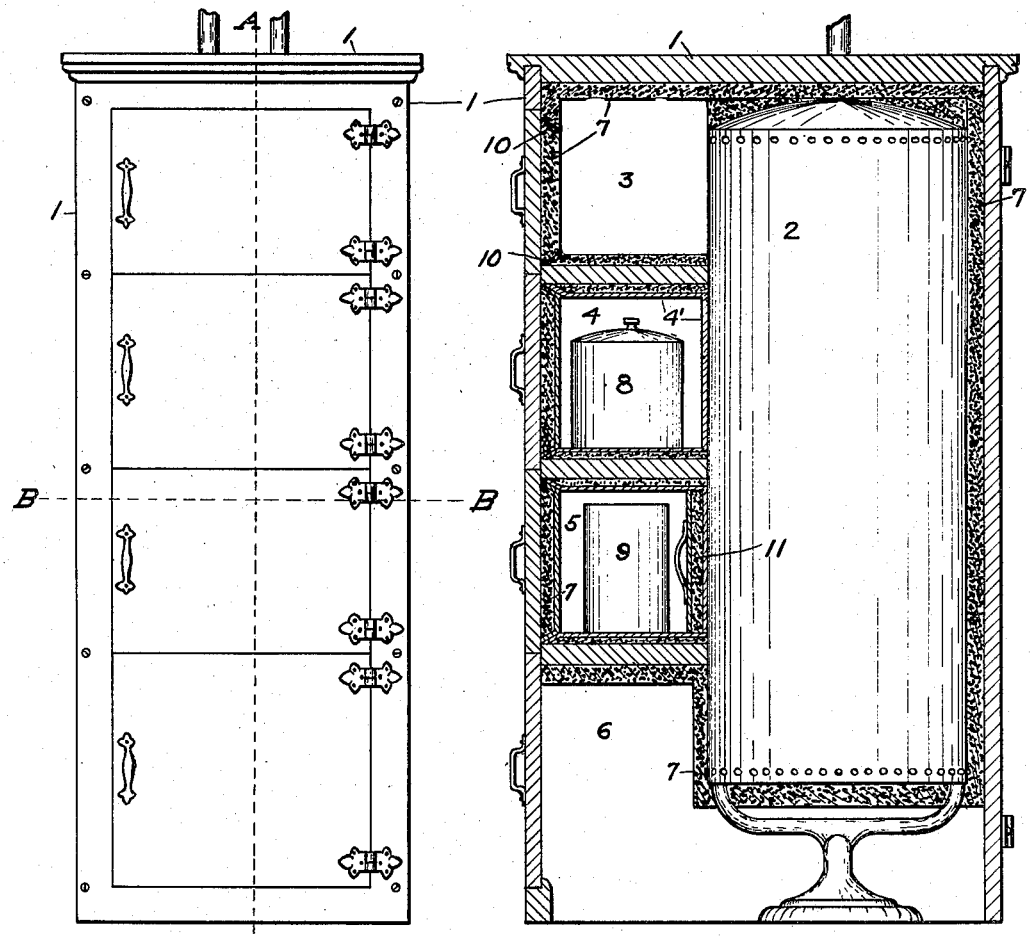
Figure 3:
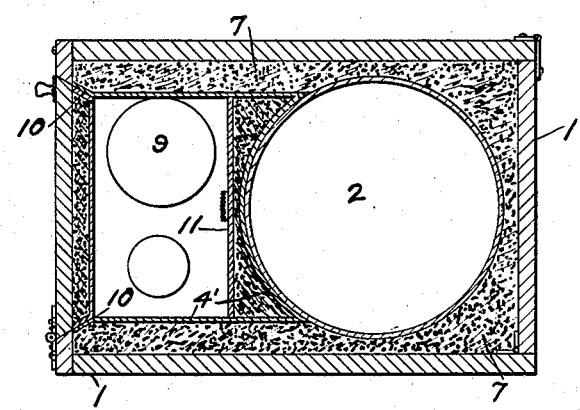

Figure 1 is a face or front elevation of one embodiment of the invention; Fig. 2 is a vertical sectional view taken on line A—A of Fig. 1; and Fig. 3 is a horizontal sectional view taken on line B—B of Fig. 1.

Referring to the drawings, 1 designates the cabinet proper, comprising in the present embodiment a square casing adapted to be erected about a hot water tank or boiler 2, which said tanks are in common use with kitchen ranges or furnaces for furnishing hot water for domestic purposes. This cabinet, as shown, stands upon the floor and is so constructed that it can be taken apart in sections and removed from one place to another. To this end, therefore, the walls thereof are constructed so as to be screwed together by means of screws, or where possible to be joined together by means of hinges or other suitable fastenings which will permit of their ready removal or adjustment. The cabinet is divided or arranged into compartments or chambers. In the present showing the rear portion of the cabinet is constructed to receive and inclose the tank or boiler 2, while the front portion thereof is divided into four compartments, 3, 4, 5 and 6, each provided with a suitable door, as clearly shown in the drawings. The cabinet is provided interiorly with a lining of heavy insulating or non-conducting material, such as asbestos, felt or other suitable non-conducting material, as indicated by 7. The purpose of this insulating material is to convert the compartments or chambers 3, 4 and 5 into heat-retaining cooking chambers into which can be placed receptacles containing food stuffs, as indicated by 8 and 9, which have been previously heated to a high degree and then placed within these insulated chambers and allowed to cook by their own heat, which is retained within the chamber by reason of the non-conductibility of the lining and the close fitting construction of the cabinet.

The tank or boiler 2 is wholly within and protected by the cabinet, and, in the present showing of the invention, is directly covered with the insulating material except as to those portions thereof intended to form the back wall of the cooking chamber, or to be in direct contact with the back wall thereof, hereinafter referred to.

Referring now to Fig. 2, the upper portion of the boiler is shown as forming a back wall for cooking chamber 3. Chambers 4 and 5 are shown as provided with a thin sheet metal lining 4'. This sheet metal lining for the cooking chambers makes them absolutely sanitary and prevents any possibility of the insulating or packing material becoming impregnated with the vapors or spillings of the food stuffs being cooked. This lining constitutes the innermost surface of the cooking chamber and is made perfectly tight so there is no communication between the interior of the chamber and the insulating material with which it is surrounded. The doors of the cooking chambers are also provided interiorly with a covering of the insulating material and where the chamber itself is lined with the sheet metal lining, the door is likewise provided with such a lining.

In order to secure the best results in sealing the cooking chambers from the outside atmosphere, the doors thereof are made bevel-shape, as indicated at 10, so that when the doors are closed the interior of the cabinet is insulated from the outside and any heat which may be generated therein is prevented from escaping or radiating into the room.

The efficiency of the tank or boiler 2 which is inclosed within this insulated cabinet and protected by the lining of non-conducting material, is very greatly increased. Owing to the fact that the heat generated therein from the range or furnace with which it may be connected cannot radiate into the atmosphere, the water therein can be more readily heated and also be heated to a much higher degree than can be done when the boiler is exposed and the heat therefrom allowed to radiate into the room. It will be seen, therefore, that with the temperature of the tank and the water therein contained raised to or beyond the boiling point, the cooking chambers in contact therewith will also be heated to the same degree by reason of the fact that both boiler and chamber are insulated from the outside atmosphere and are in communication with each other, and that when a receptacle of food stuff which has been previously heated to the boiling point is placed therein, its heat is not lessened by being absorbed by a cold nest or chamber, but on the contrary it is placed into a chamber or nest of a high temperature. It will therefore be understood that the insulating of the hot water tank or boiler very materially increases the efficiency of the cooking chambers by raising their temperature to a high degree, and also that the efficiency of the tank or boiler as a hot water producer and retainer is also very materially increased. In other words, by making it possible to heat the water in the tank to a higher degree by insulating it, also makes it possible to raise the temperature of the cooking chamber with which it is in communication, and thus increase the efficiency as a cooking chamber.

There will be times when portions of the tank will not be heated, as for instance the lower portion thereof, and when it will be desired to insulate the tank at this point from the cooking chamber near it. For this purpose there are provided removable back walls, as indicated at 11, in chamber 5, comprising a base or foundation piece provided upon the front thereof with a handle, as shown, and upon the back thereof with a form made of the insulating material, constructed to fit snugly into the rear portion of the chamber, as indicated in Figs. 2 and 3. These back walls can be placed in all of the chambers as may be required. If the water in the tank is cold, then a back wall will be placed in the chamber which is going to be used and it becomes a cooking chamber similar to those now used and to be had in the market, comprising simply an insulated nest or chamber to receive the heated receptacle, with no means of heating it before the receptacle is placed therein.

The lower part of the cabinet, designated as chamber 6, is shown as a closet or place into which to store things. Another chamber might be constructed at this point if desired to be used in the ordinary manner without regard to the boiler.

These cabinets are to be manufactured in regular sizes and adapted to be purchased in the market, according to the size of the tank, and placed upon the tank without any reconstruction. If a man has a 40 gallon tank, a cabinet for that size of tank will be needed and can be readily put into place about his tank.

While we have described and illustrated but one embodiment of our invention, we are aware that modifications and changes can be made therein without departing from the spirit of the invention and we do not, therefore, limit our invention to the particular embodiment here shown and described.

We claim:

1. The combination with a hot water tank or boiler, of a cabinet or chamber having insulating walls and adapted to inclose bodily said tank or boiler for the purpose of conserving the heat thereof, and provided interiorly with space adjacent said tank or boiler for receiving food stuffs which have been previously heated, whereby the temperature of said food stuffs can be conserved until wanted.

2. The combination with a hot water tank or boiler, of a cabinet or chamber having insulating walls and adapted to inclose bodily said tank or boiler for the purpose of conserving the heat thereof, and provided interiorly with one or more insulated cooking chambers arranged exteriorly of but adjacent said tank or boiler, whereby the heat from said tank or boiler can be utilized for increasing the temperature of said cooking chambers.

3. As an article of manufacture, a cabinet provided with a boiler-receiving chamber to receive bodily a hot water tank or boiler, and with one or more insulated cooking chambers arranged within said cabinet exteriorly of but adjacent said boiler-receiving chamber, whereby any increase in the temperature of said boiler-receiving chamber can be utilized to increase the temperature of said cooking chambers.

4. As an article of manufacture, a cabinet having a lining of insulating material and having arranged therein a boiler-receiving chamber or apartment constructed to receive bodily a hot water tank or boiler for the purpose of conserving the heat therein, and one or more independent cooking chambers within said cabinet exteriorly of said boiler-receiving chamber but adjacent thereto, whereby any increase in the temperature of said boiler-receiving chamber operates to increase the temperature of said cooking chambers.

5. As an article of manufacture, a cabinet provided with a lining of insulating or non-conducting material and having therein one or more cooking chambers and a boiler-receiving chamber adapted to communicate heat to said cooking chambers when heated, and a back-wall adapted to be placed in said cooking chambers to insulate them from said boiler chamber when desired, substantially as described.

6. As an article of manufacture, a collapsible cabinet, having insulating walls and having therein a boiler-receiving chamber or apartment for receiving bodily a hot water tank or boiler, and one or more independent cooking chambers arranged exteriorly of said boiler-receiving chamber, but in such relationship thereto that the heat therein operates to increase the temperature of said cooking chambers, for the purpose described.

7. In combination with a range boiler, a sectional cabinet adapted to be constructed about said boiler and provided with a lining of insulating material whereby to conserve the heat within said boiler, and one or more cooking chambers also insulated from the outside atmosphere but in communication with said boiler in such a way that the temperature of said boiler is utilized to increase the temperature of said cooking chambers, substantially as and for the purposes described.

OTTO OLSTON.
ALBERT B. OLSTON.

Witnesses:
W. R. LITZENBERG,
W. A. ROBBINS.